US012661833B2

(12) United States Patent
Kulik et al.

(10) Patent No.: US 12,661,833 B2
(45) Date of Patent: Jun. 23, 2026

(54) METHOD AND SYSTEM FOR PRODUCING MICROSTRUCTURES

(71) Applicant: LTS Lohmann Therapie-Systeme AG, Andernach (DE)

(72) Inventors: Michael Kulik, Urmitz (DE); Olga Grünwald, Koblenz (DE); Philip Roos, Kettig (DE); Nikolaj Tissin, Sinzig (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 292 days.

(21) Appl. No.: 18/271,756

(22) PCT Filed: Jan. 12, 2022

(86) PCT No.: PCT/EP2022/050510
§ 371 (c)(1),
(2) Date: Jul. 11, 2023

(87) PCT Pub. No.: WO2022/152734
PCT Pub. Date: Jul. 21, 2022

(65) Prior Publication Data
US 2024/0058995 A1      Feb. 22, 2024

(30) Foreign Application Priority Data

Jan. 12, 2021      (DE) ..................... 10 2021 100 396.2

(51) Int. Cl.
*B29C 43/56* (2006.01)
*B29C 39/24* (2006.01)
(Continued)

(52) U.S. Cl.
CPC .............. *B29C 43/56* (2013.01); *B29C 39/24* (2013.01); *B29C 39/42* (2013.01); *B29C 43/34* (2013.01);
(Continued)

(58) Field of Classification Search
CPC ... B29C 39/42; B29C 43/56; B29C 2043/561; B29C 2791/006; B29C 39/24;
(Continued)

(56) References Cited

U.S. PATENT DOCUMENTS 9,498,524 B2 * 11/2016 Ghartey-Tagoe .... A61B 17/205
2008/0269685 A1 * 10/2008 Singh ..................... A61K 38/29
604/173

(Continued)

FOREIGN PATENT DOCUMENTS

DE      102005042656 A1      3/2007
DE      102011054789 A1      4/2013
(Continued)

*Primary Examiner* — Jeffrey M Wollschlager
(74) *Attorney, Agent, or Firm* — The Webb Law Firm

(57) ABSTRACT

The invention relates to a method for producing microstructures, the method including providing a planar mold element, which includes at least one mold opening for the microstructure to be produced, wherein the at least one mold opening has a first opening and a second opening; providing a first formulation at the second opening; generating a negative pressure in the mold opening; and taking up the first formulation through the second opening into the mold opening on account of the negative pressure in the mold opening. The invention further relates to a system for producing microstructures.

16 Claims, 7 Drawing Sheets

(51) Int. Cl.

| | |
|---|---|
| *B29C 39/42* | (2006.01) |
| *B29C 43/34* | (2006.01) |
| *B29C 43/46* | (2006.01) |
| *B29L 31/00* | (2006.01) |

(52) U.S. Cl.
CPC ...... *B29C 43/46* (2013.01); *B29C 2043/3483* (2013.01); *B29C 2043/561* (2013.01); *B29C 2791/006* (2013.01); *B29L 2031/756* (2013.01)

(58) Field of Classification Search
CPC . B29C 43/34; B29C 43/46; B29C 2043/3483; B29C 43/28; B29C 43/222; B29C 33/405; B92C 39/42; B29L 2031/56; B29L 2031/7544; A61M 2037/0053; B29K 2867/00; B29K 2869/00; B29K 2875/00
See application file for complete search history.

(56) References Cited

U.S. PATENT DOCUMENTS

| | | | | |
|---|---|---|---|---|
| 2017/0050010 A1* | 2/2017 | Mcallister | ......... | A61M 37/0015 |
| 2017/0266394 A1* | 9/2017 | Admati | .............. | A61M 5/3275 |
| 2019/0030309 A1 | 1/2019 | Kwon | | |
| 2019/0351204 A1 | 11/2019 | Sakazaki et al. | | |
| 2020/0197679 A1* | 6/2020 | Li | ...................... | B29C 45/2626 |
| 2022/0062604 A1 | 3/2022 | Kulik et al. | | |

FOREIGN PATENT DOCUMENTS

| | | | |
|---|---|---|---|
| DE | 102018009594 | A1 | 2/2017 |
| DE | 102020125484 | A1 | 3/2022 |
| EP | 2343101 | A1 | 7/2011 |
| EP | 3144030 | A1 | 3/2017 |
| KR | 1020170011578 | A | 2/2017 |
| WO | 2018213605 | A1 | 11/2018 |

* cited by examiner

METHOD AND SYSTEM FOR PRODUCING MICROSTRUCTURES

CROSS-REFERENCE TO RELATED APPLICATIONS

This application is the United States national phase of International Application No. PCT/EP2022/050510 filed Jan. 12, 2022, and claims priority to German Patent Application No. 10 2021 100 396.2 filed Jan. 12, 2021, the disclosures of which are hereby incorporated by reference in their entireties.

BACKGROUND OF THE INVENTION

Field of the Invention

The invention relates to a method for producing microstructures, in particular to a method for producing microarrays. The invention further relates to a system for producing microstructures, in particular to a system for producing microarrays.

Microarrays have a plurality of microneedles that are typically arranged in a support element, such as a patch, a plaster or the like, or are connected to the same. The length of the microneedles is, in particular, dimensioned such that, when being pushed into the skin of a patient, they penetrate into the skin only so far that the needle tips do not come into contact with nerves and vessels, if possible The needles comprise an active ingredient, for example, a medicament. The corresponding active ingredient may be provided on an upper side of the needles or be provided in the needles. When the active ingredient is arranged in the needles, the needles or components of the needles are made of a material that dissolves in the skin of a patient.

Description of Related Art

Microarrays are produced using silicone molds, for example, which have a plurality of mold openings. To fill the mold openings, a liquid provided with the active ingredient is typically applied onto the upper side of the silicone mold. After the liquid has dried, another liquid is applied, if necessary. The support element is applied onto the lower side of the material introduced into the silicone mold, the microneedles are removed from the silicone mold and are packaged subsequently.

Presently, the production of microarrays is very complex and costly.

Moreover, problems occur when filling the typically conical or pyramidal mold openings. The mold openings are often not sufficiently filled with filling material. For example, cavities and/or air inclusions can occur. This problem occurs in particular in the tips of the in particular conical or pyramidal mold openings. Such faulty filling may cause, for example, problems during application, because, for example, the faulty tips do not properly penetrate into the skin and/or an insufficient active ingredient dosage may occur due to the formulation missing from the cavities.

Pollution and/or contamination cause further problems in present-day microarray production.

SUMMARY OF THE INVENTION

It is an object of the invention to provide a method for producing microstructures, in particular microarrays, in which the scalability is improved and which is preferably suitable for the production of high quantities. It is also an object of the invention to provide a corresponding system for producing microstructures.

According to the invention, the object is achieved by a method as described herein and a system as described herein.

The present method for producing microstructures is, in particular, a method for producing microarrays. A preferably first step of the method consists in providing a preferably two-dimensional mold element. The mold element has at least one, preferably a plurality of mold openings for the microstructures to be produced. The at least one mold opening is, in particular, a negative mold for the microstructures to be produced. The mold opening corresponds in particular to a cavity. The at least one mold opening comprises a first opening and a second opening which, in particular, is located opposite the first opening. Thus, it is preferred that the mold opening is open on both sides. It is preferred that the first opening and the second opening open the mold opening to the environment. Preferably, the first opening and the second opening form a fluid connection between the mold opening and the environment. The mold opening extends preferably from a side of the two-dimensional mold element to a side of the mold element opposite the first side. If, in a preferred embodiment, the mold element is designed as a film, the mold opening extends in particular from one side of the fil to the other side of the film. It is preferred that the at least one mold opening is an embossed mold opening preferably made using an embossing roll. A further step of the method consists in providing a first formulation at the second opening. It is preferred that the first formulation includes at least one active ingredient. The first formulation is designed in particular for forming tips of the microstructures. In particular, the provision of the first formulation is such that the formulation is in contact with the second opening. It is particularly preferred that the provision is such that the second opening is immersed in the first formulation. Another step of the method consists in generating a negative pressure and/or suction in the mold opening. The negative pressure may also be referred to as a vacuum, preferably not a full vacuum. Here, negative pressure refers in particular to a negative pressure ratio relative to the ambient pressure. A further, in particular next step of the method consists in taking up the first formulation into the mold opening through the second opening. Here, the taking-up is effected at least in part by the negative pressure in the mold opening. In this respect, it is preferred that the first formulation is drawn in through the second opening. In addition to the first formulation being taken up because of the negative pressure, it is preferred that the first formulation is drawn into the mold opening due to a capillary effect. It is preferred that this taking-up caused by a capillary effect occurs prior to and/or during the taking-up caused by negative pressure. Taking up the first formulation into the mold opening is performed in particular to form a part of the microstructures to be produced. In particular, this taking-up is a drawing or sucking.

In a preferred embodiment, the negative pressure is generated in the mold opening by expanding a volume of the mold opening. The volume to be expanded is, in particular, the volume between the first and the second opening of the mold opening. It is preferred that the expansion of the mold opening volume is realized such that the resulting volume expansion substantially corresponds to the volume of the first formulation to be taken up. In particular, the volume of the mold opening is expanded by at least 3%, preferably by at least 5%, particularly preferred by at least 10%, it being more preferred to expand the volume of the mold opening by at least 20%.

Preferably, a further step of the method consists in reducing the volume of the mold opening, with this step being performed before generating the negative pressure in the mold opening, in particular before the expansion of the volume of the mold opening. The step of providing the first formulation is performed preferably before and/or after reducing the volume. It is preferred that the reduction of the mold opening volume is realized such that the resulting volume reduction substantially corresponds to the volume of the first formulation to be taken up. Specifically, the volume of the mold opening is reduced by at least 3%, preferably by at least 5%, particularly preferred by at least 10%, it being more preferred to reduce the volume of the mold opening by at least 20%.

It is preferred that the volume of the mold opening is reduced by compressing the mold element, at least partly. Here, compressing refers, in particular, to pressing and/or longitudinal expansion. For compressing, it is preferred that the mold element is pressed on the side of the first opening, preferably on both sides of both openings and/or that the mold element is expanded, in particular in the longitudinal direction.

It is preferred that compressing the mold element is performed using at least one roller. In particular, the roll is a press roll. The at least one press roll presses at least one surface, in particular the surface of the first opening of the mold element. It is particularly preferred that the compressing is performed on both sides of the mold element using two rolls. It is preferred that the two rolls are arranged offset in the rolling direction.

A further step of the method preferably consists in arranging an auxiliary element on the side of the mold element with the first opening. Here, the auxiliary element is brought into contact with that side, in particular connected with the same, preferably in an adhesive manner. The auxiliary element preferably comprises an auxiliary film, and in particular consists thereof. Arranging the auxiliary element is preferably performed before generating the negative pressure in the mold opening, particularly preferred before expanding the volume of the mold opening. In particular, the auxiliary element is arranged before or during the reduction of the volume of the mold opening.

Preferably, a further step of the method consists in closing the first opening of the mold opening. In particular, the first opening is closed in a substantially air-tight manner. It is preferred that the closing is performed using the auxiliary element, so that the auxiliary element seals the first opening of the mold opening. The step of closing the first opening is performed prior to generating the negative pressure in the mold opening. In particular, closing the first opening is performed after the reduction of the volume of the mold opening, preferably after the compressing of the mold element.

A preferred further step of the method consists in the removal of the auxiliary element, preferably from the mold element. This removal is performed after the first formulation has been taken up into the mold opening. It is preferred that the removal is performed by pulling off the auxiliary element.

It is preferred that the at least one mold opening is cylindrical or conical in shape. The cylindrical or conical shape in particular has a round, triangular or quadrangular, particularly preferred square cross section. It is preferred that the conical shape tapers from the first opening to the second opening. It is possible that the conical shape is designed as a truncated cone. A conical shape with an angular cross section could also be described as a pyramid shape.

The second opening preferably comprises a smaller cross-sectional area than the first opening. The cross section of the mold shape preferably tapers from the first opening towards the second opening.

The reduction of the volume of the mold opening, in particular the at least partial compressing of the mold element, is preferably performed by bending the mold element. The bending is effected in particular along a transverse direction of the mold element, so that in particular one bending edge is perpendicular to the longitudinal direction of the mold element. It is particularly preferred to perform the bending in the direction of the first opening and/or in a direction opposite to the tapering direction of the mold opening, in particular in case of a conical mold opening. Thus, preferably, a compressed strand of the mold element is located on the side of the first opening and/or on the side on which the mold opening is enlarged. The bending is performed in particular under an angle between 0° and 180°, preferably between 10° and 90°, particularly preferred between 30° and 60°. Due to the bending, the mold element has, in particular, a neutral strand, as well as a compressed strand on the side of the mold element to which the bending is performed, and a developed strand on the side opposite the compressed strand. Thus, preferably, a compressed portion exists on the side of the compressed strand of the mold element and a stretched portion exists on the side of the developed strand of the mold element. The bending preferably has the effect that the compressed portion, in particular the compressed strand, of the mold element becomes smaller. Thus, in particular also the mold opening, preferably the volume of the mold opening, becomes smaller in this region of the mold element. Likewise, the bending thus preferably causes the stretched portion, in particular the developed strand, of the mold element to become larger. Thus, in particular also the mold opening, preferably the volume of the mold opening, becomes larger in this region of the mold element. In a preferred embodiment, in particular in an embodiment of the mold opening with a conical shape, the mold opening has a larger volume, in particular a significantly larger volume, on the side of the compressed strand than on the side of the developed strand. Thus, bending preferably causes the volume on the side of the compressed strand to decrease more than the volume on the side of the developed strand increases. Overall, preferably a decrease of the total volume of the mold opening is caused by the bending.

The bending is preferably performed using the at least one roll. The at least one roll is preferably a bending roll.

The expansion of the volume is performed in particular by restoring the mold element, in particular to the initial shape. It is particularly preferred that the restoring is a re-bending of the mold element bent by the bending operation and/or a relaxation of the compressed, in particular pressed and/or longitudinally expanded mold element.

It is preferred that the mold element includes, in particular consists of a film.

It is particularly preferred that the mold element comprises, in particular consists of TPU, PC or PETG.

The mold element is preferably compressible. It is preferred that the mold element is elastic.

Preferably, a second formulation is provided at the first opening after the step of taking up the first formulation. It is preferred that the second formulation contains no active ingredient. However, it is also possible that the second formulation contains at least one active ingredient. After the provision of the second formulation, the second formulation is taken up into the mold opening through the first opening. It is preferred that, in doing so, the mold opening, in particular the remaining volume of the mold opening is filled completely with the second formulation. In particular, the second formulation bonds with the first formulation, in particular by substance-to-substance bonding. Preferably, the second formulation is taken up by being pushed in, in particular pressed in. The pushing is preferably performed using a roll. It is preferred that in the step of taking up, the formulation is in contact with the first opening on the one side and is covered on the other side by a formulation element, in particular the second formulation element described below. Preferably, the pressure for pushing in the second formulation, in particular the roll, is applied onto this formulation element.

Preferably, the first formulation is provided using a first formulation element. The first formulation element preferably comprises, in particular consist of a film. The first formulation element comprises the first formulation. Preferably, the first formulation is arranged on the first formulation element, in particular in drops. It is preferred that the first formulation element comprises a formulation receptacle which preferably comprises a depression. In other words, this formulation receptacle is a type of bowl-shaped mold in the formulation element, in which the formulation is located. As an alternative or in addition to providing the first formulation by means of the first formulation element, the second formulation is provided using a second formulation element comprising the second formulation. In particular, the second formulation element is analogously implemented with one or more features of the first formulation element.

After the first formulation has been taken up and/pr the second formulation has been taken up, in particular a drying is performed Drying the first and/or the second formulation is performed in particular via the first opening of the mold opening. Drying is performed in particular by means of a preferably warm air flow which is in particular in direct contact with the first and/or the second formulation. It is preferred that the drying causes the first and/or second formulation solidify to form microstructures. In addition or as an alternative to the air flow, drying can be effected using thermal radiation, in particular infrared radiation.

A preferred further step of the method consists in metrologically testing the first and/or second formulation. The testing is performed in particular by means of an optical test device. It is preferred that the optical test device includes a camera. The test is carried out after the first and/or the second formulation has been taken up. It is particularly preferred that the test is carried out after or before the drying step.

Preferably, the first formulation, which has at least partially solidified to form a microstructure, as well as, preferably, the second formulation bonded with the first formulation are demolded. Demolding is performed at and through the first opening of the mold opening. Preferably, demolding is performed after drying, particularly preferred after testing. Preferably, demolding is performed at the second formulation.

Preferably, demolding is performed using a cover element. In particular, the cover element comprises, in particular consists of a cover film. The cover element is connected with the first formulation or the second formulation. It is preferred that the connection is a substance-to-substance bond, in particular an adhesive bond. As an alternative or in addition to the demolding by means of a cover element, demolding is performed by removing, in particular by pulling off the mold element. It is preferred that the cover element is the second formulation element, so that demolding is performed using the second cover element.

Preferably, the demolded microstructure is packaged. It is preferred that the packaging is done using a blister element. Packaging with a blister film is particularly preferred.

The method is carried out in particular with a system having one or a plurality of the features of the system described below.

The present system for producing microstructures is, in particular, a system for producing microarrays. In particular, the system is a device. The system is in particular designed for the implementation of the above described method. It is particularly preferred that the system comprises one or a plurality of the above described features, in particular the device features described there. The system includes a mold element. The mold element is in particular compressible or elastic. The mold element comprises at least one mold opening for the microstructures to be produced. The at least one mold opening is, in particular, a negative mold for the microstructures to be produced. The mold opening corresponds in particular to a cavity. The mold opening preferably comprises a first opening and a second opening which, in particular, is located opposite the first opening. The mold opening is open in particular on both sides, so that the mold element comprises at least one continuous mold opening. It is preferred that the first opening and the second opening open the mold opening to the environment. Preferably, the first opening and the second opening form a fluid connection between the mold opening and the environment. Further, the system comprises a compression device. The compression device is, in particular, a pressing and/or bending device. The compression device preferably includes a roll, particularly preferred a press roll and/or a bending roll, and in particular consists thereof. The compression device is configured to compress the mold element. In particular, the compression device is arranged and/or configured to act on the mold element in a pressing manner and/or the bend the molding element. In a preferred embodiment, the compression device is configured to reduce the volume of the mold opening by compression.

It is preferred that the compression device has two opposite rolls, in particular press rolls and/or bending rolls. In particular, the rolls are arranged such that the mold element can be compressed, in particular pressed and/or bent, between the rolls. The mold element is preferably arranged between the rolls. In particular, the rolls are arranged offset relative to each other in the roll guiding direction.

It is preferred that the system comprises a preferably aseptic insulator in which at least the compression device and at least a part of the mold element are arranged.

The mold element of the method according to the invention and/or the system according to the invention is, in particular a mild element according to DE 10 2020 125 484 A1.

BRIEF DESCRIPTION OF THE DRAWINGS

The terms Fig., Figs., Figure, and Figures are used interchangeably in the specification to refer to the corresponding figures in the drawings.

In the following, the invention is described in more detail by means of preferred embodiments with reference to the accompanying drawings.

US 12,661,833 B2

7                                                          8

Figure 1A:
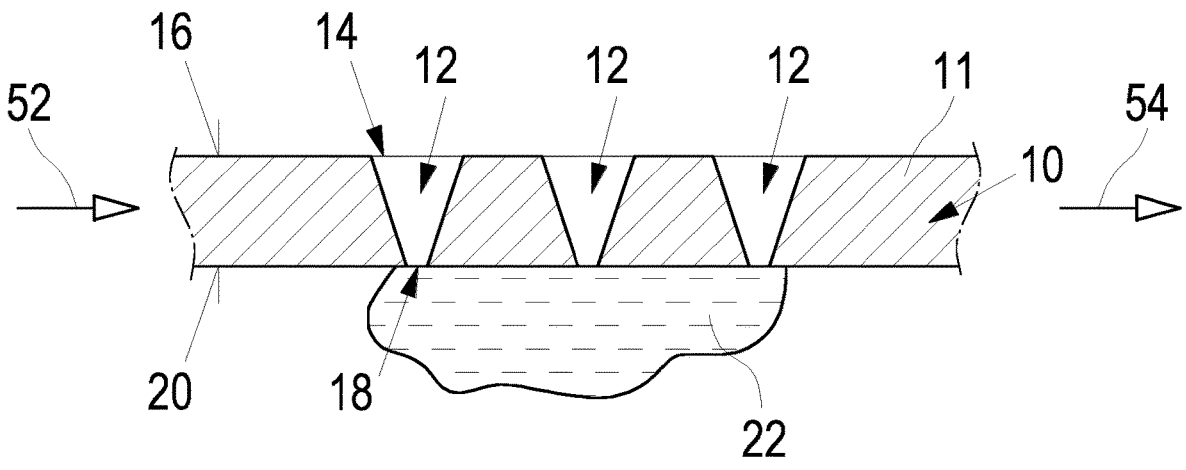
Figure 1B:
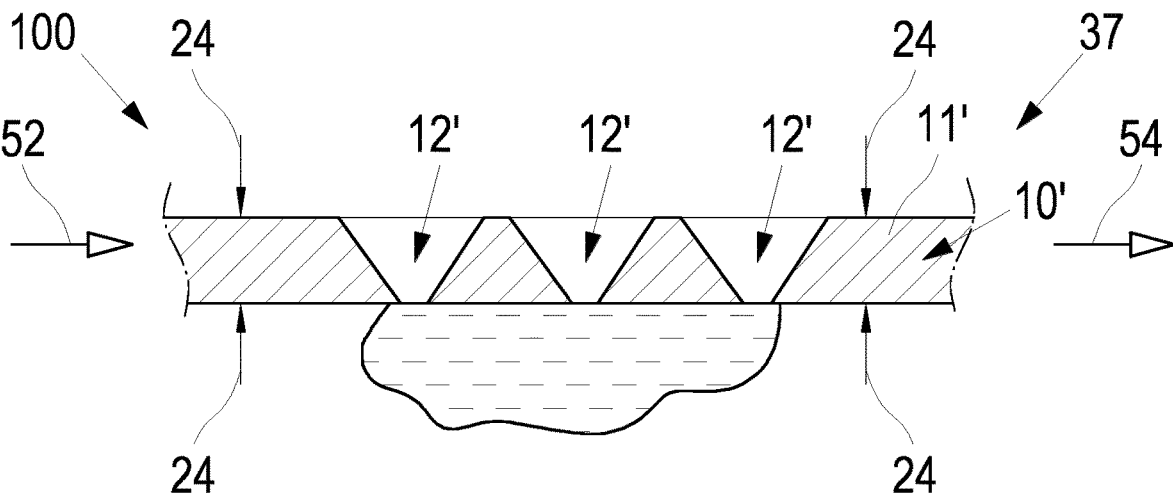
Figure 1C:
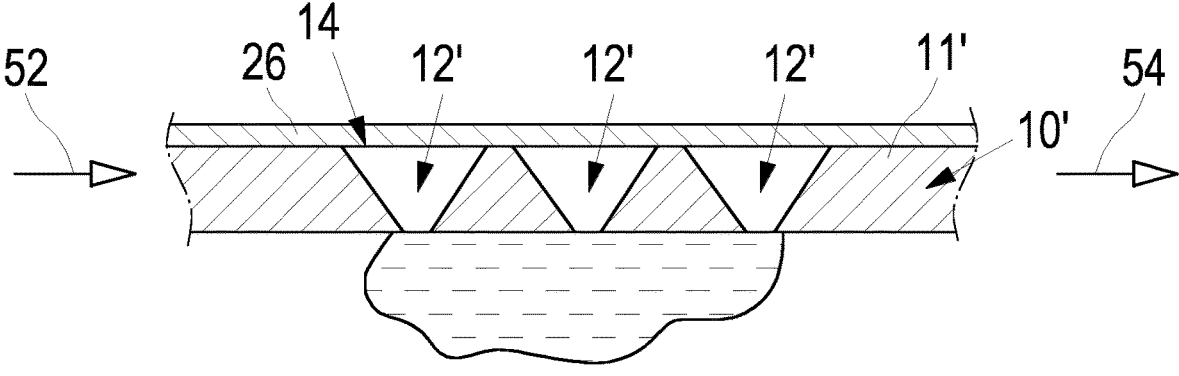
Figure 1D:
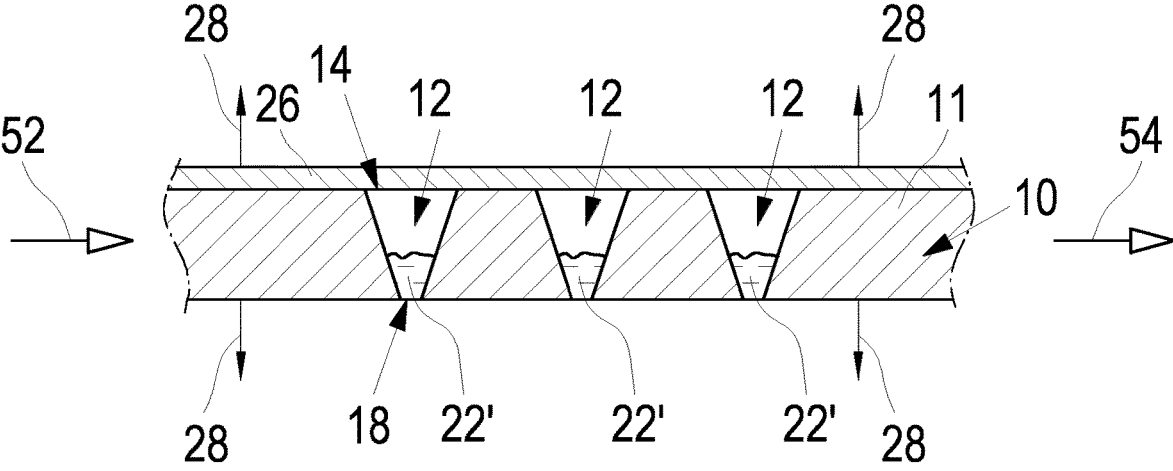
Figure 2A:
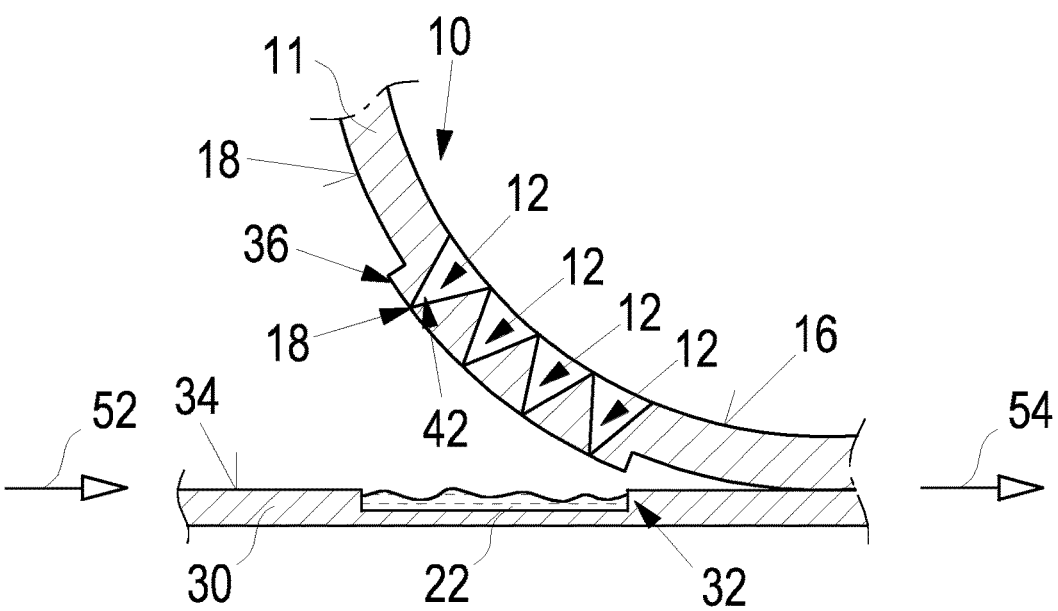
Figure 2B:
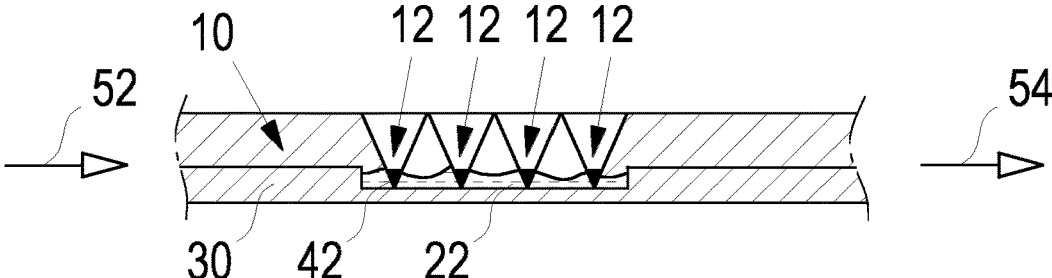
Figure 2C:
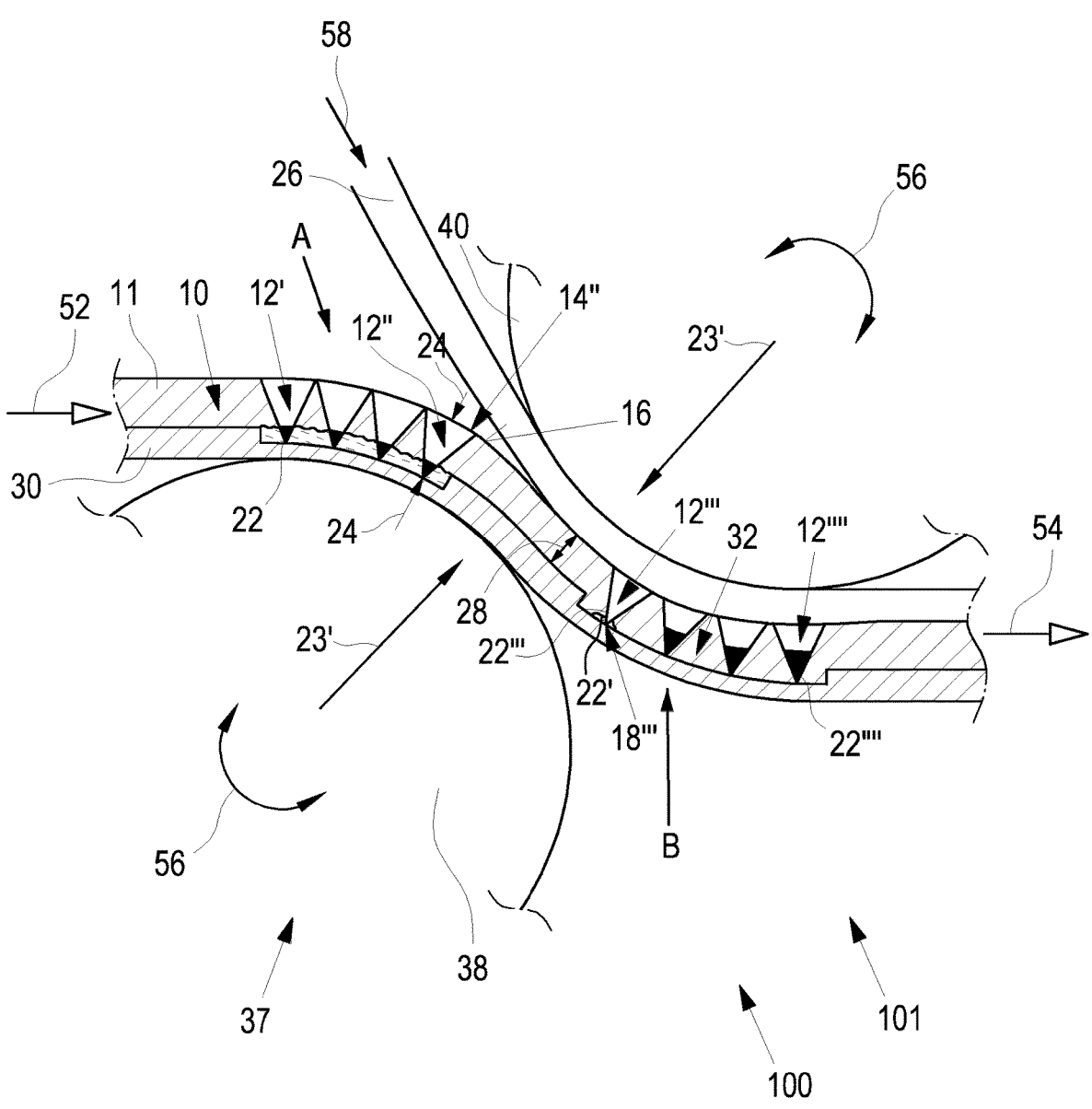
Figure 3:
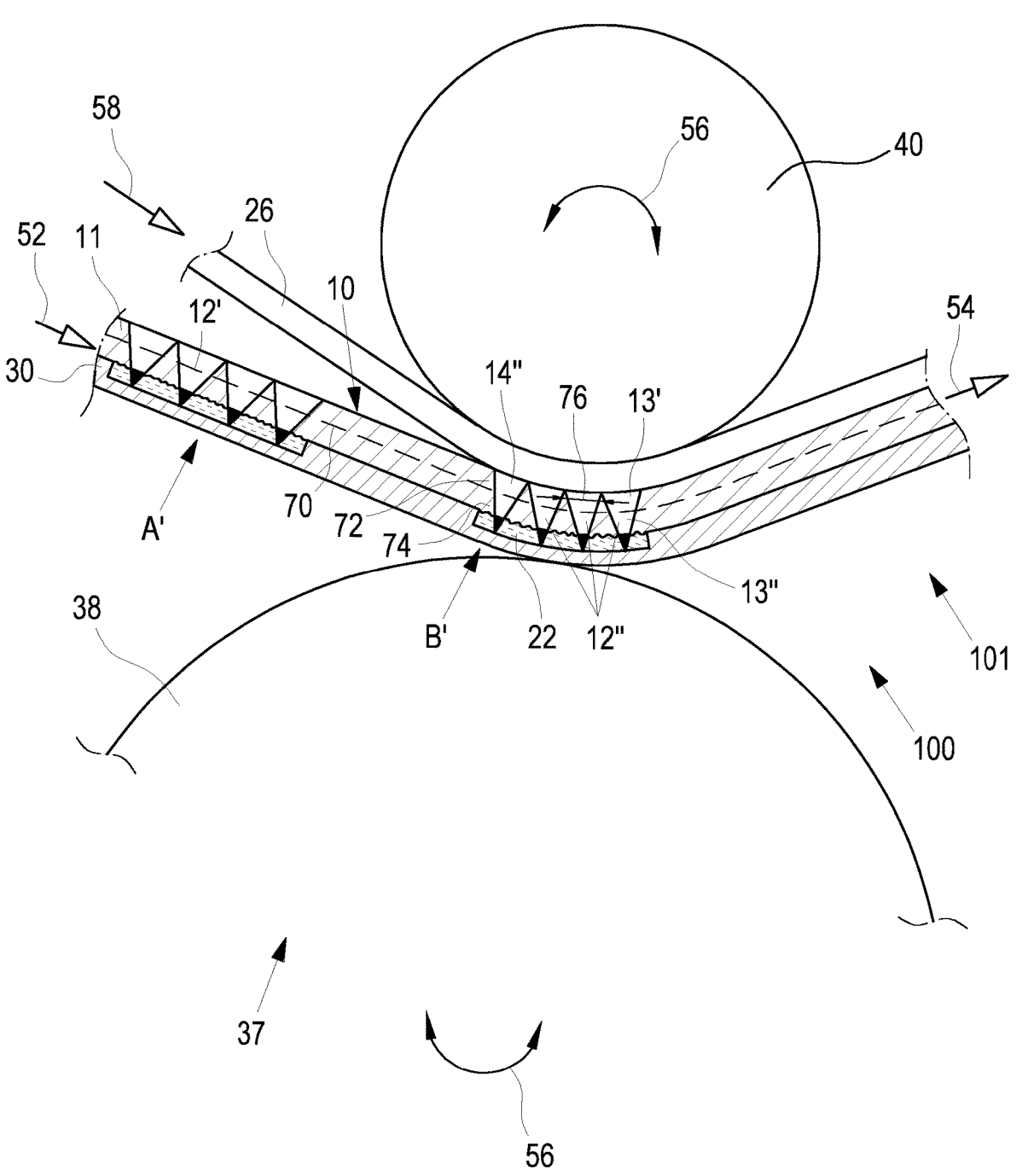
Figure 4:
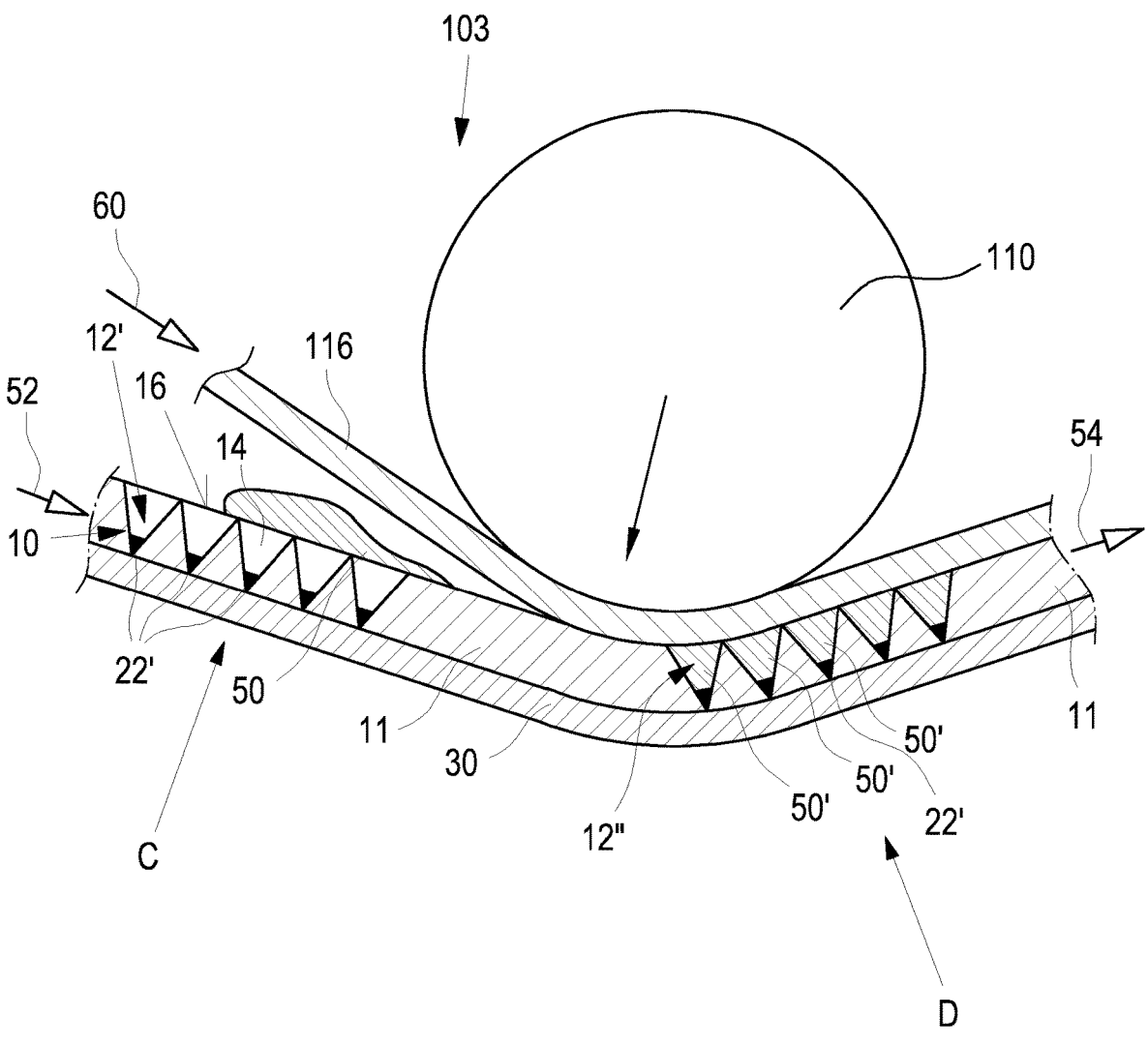
Figure 5:
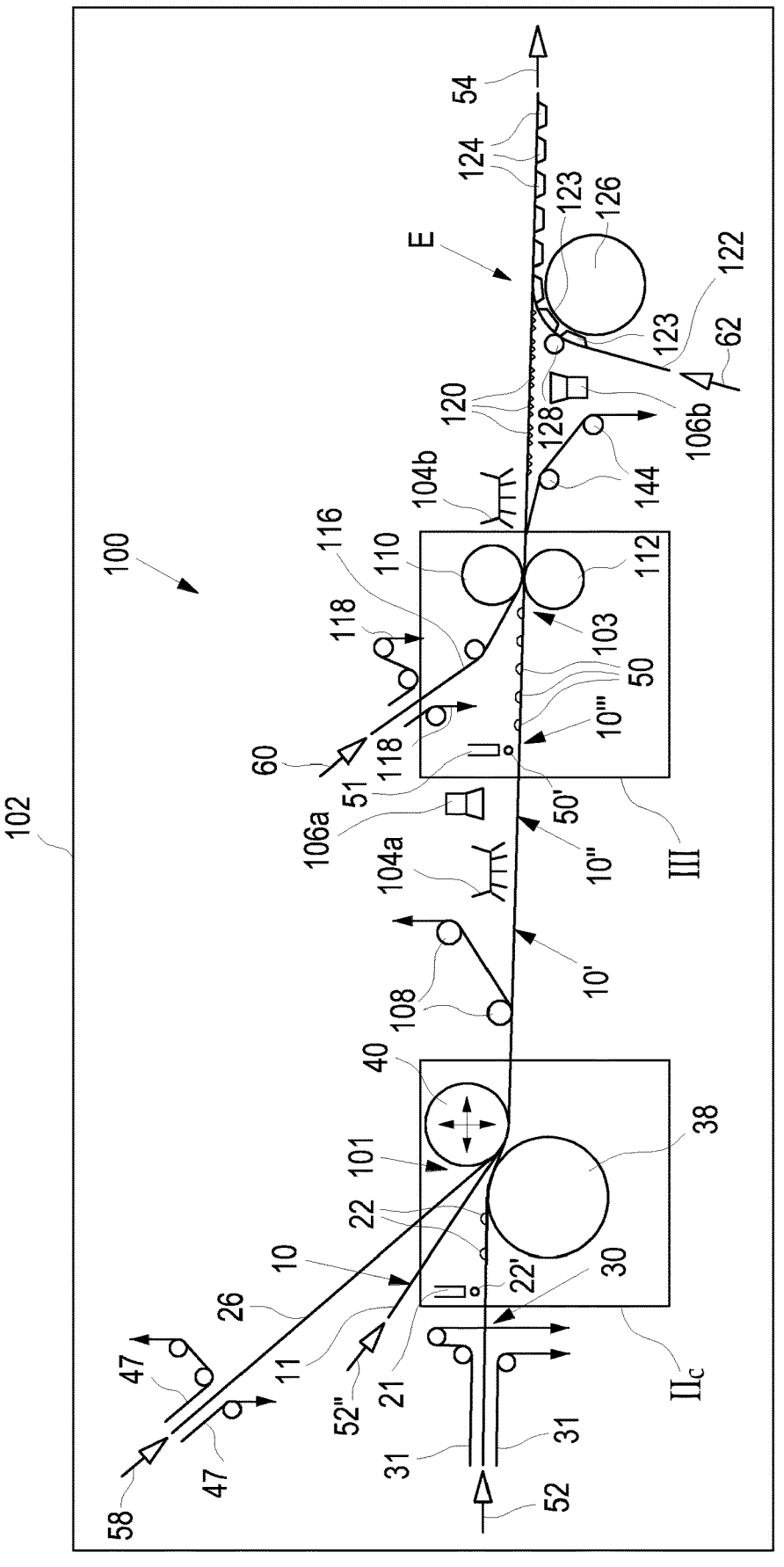

In the drawings:

FIGS. 1a-1d are schematic sectional side views of production states showing the method according to the invention, with FIG. 1b also showing an embodiment of a system for producing microstructures according to the invention, FIGS. 2a-2c are schematic sectional side views of production states showing the method according to the invention, with FIG. 2c also showing an embodiment of a system for producing microstructures according to the invention, FIG. 3 is a schematic sectional side view of a production state showing the method according to the invention, while also showing an embodiment of a system for producing microstructures according to the invention, FIG. 4 is a schematic sectional side view of a production state showing an embodiment of the method according to the invention, and FIG. 5 is a schematic sectional side view of a production state showing an embodiment of the method according to the invention and showing another embodiment of a system for producing microstructures according to the invention.

DESCRIPTION OF THE INVENTION

In the Figures, similar or identical components or elements are identified by the same reference numerals or variations thereof (12, 12' and 12"). In particular in the interest of improved clarity, preferably elements already identified are not provided with reference numerals in all Figures.

FIG. 1a shows a mold element 10 which, in the present instance, is designed in particular as a film 11. At the upper surface illustrated, the film 11 has a first side 16 and an opposite second side 20. Conical or pyramidal mold openings 12 extend through the film 11. On the first side 16, the mold openings 12 have a first opening 14. The mold openings 12 taper, starting from the first side 16, to the second side 20, with a second opening 18 being formed on the second side 20. On the second side 20, a first formulation 22, preferably containing an active ingredient, is arranged in contact with the second openings 18 of the mold openings 12. It is possible (though not illustrated) that a part of the formulation 22 is received in the mold openings 12 through the second openings 18 due to capillary effects.

Arrow 52 illustrates a supply, arrow 54 a discharge of the mold element, so that the method can preferably be implemented as a plow process and/or as a roll process.

FIG. 1b illustrates a second state of the embodiment in FIG. 1a. Illustrated schematically by the arrows 24 is a pressure that has been exerted on the mold element 10 or the film 11. Preferably, the mold element has been compressed. Due to the exertion of pressure, the mold element 10 is compressed, so that the volume of the mold openings 12' has been reduced when compared to the embodiment in FIG. 1a. The pressure can be exerted using a compression device 37, e.g. a press device or a roll device, on one or on both sides of the mold element 10.

FIG. 1b also illustrates a system 100 for producing microstructures with a mold element 10 and a compression device 37. This compression device 37 is in particular a press device.

FIG. 1c illustrates another state in accordance with the embodiments in FIGS. 1a and 1b.

An auxiliary element 26, in particular designed as a film, has been arranged on the first side 16 of the mold element 10. Here, the auxiliary element 26 closes the first openings 14 of the mold openings 12' reduced in volume.

FIG. 1d illustrates a further state of the embodiments in FIGS. 1a to 1c. In contrast to the embodiments in FIGS. 1b to 1c, the mold element 10 has expanded again, in particular relaxed (illustrated by arrows 28). It is particularly preferred that the mold element 10 has restored itself elastically ba expanding. Thus, the volume of the mold openings 12 has expanded again. The expansion of the volume of the mold openings 12 causes a negative pressure in the mold openings 12. Since the first opening 14 of the mold openings 12 is closed, a suction effect is created at the second openings 18. Due to the suction effect, the first formulation 22 was taken up, in particular sucked into the mold openings 12, so that the mold openings 12 are now partially filled with formulations 22'. It is also possible, by corresponding dimensioning, to fill the entire mold openings 12 with the first formulation 22. It is possible that by solidification of the formulations 22' microstructures, in particular microneedles, are formed in the mold element 10.

The mold element 10 of FIG. 2a corresponds substantially to the mold element 10 of FIGS. 1a to 1b. Different from the embodiment in FIGS. 1a to 1d, the tips of the mold openings 12 in FIG. 2a are located in a protrusion 36 of the mold element 10. The second openings 18 of the mold elements 12 of FIG. 2a thus end in this protrusion 36. The first formulation 22 is provided in a depression 32 of a formulation element 30 designed as a film 30. The depression 32 is located on a first side 34 of the formulation element 30, it being preferred that the depression 32 corresponds substantially to a negative mold of the protrusion 36.

FIG. 2a shows that the film 11 of the mold element 10 and the film 30 of the formulation element 30 are combined, in particular connected (combining illustrated from left to right).

FIG. 2b illustrates another state of the embodiment in FIG. 2a. Here, the mold element 10 and the formulation element 30 are combined so that the protrusion 36 is arranged in the depression 32. Due to capillary effects a part of the formulation 22 has entered the tips 42 of the mold openings 12 through the second openings 18.

FIG. 2c shows another state, it being preferred that the embodiment of FIG. 2b is supplied from the left in the direction of the arrow 52.

The compression device 37, which in the present instance comprises two offset rolls 38, 40, exerts pressure on or compresses the mold element 10 (as illustrated by arrows 23'). As illustrated, the mold element with the formulation element 30 connected thereto extends from the left to the right (in the direction of the arrows 52, 54). The direction of rotation of the rolls 38, 40 is illustrated by the arrows 56. As illustrated, it is preferred that the roll 38 rotates clockwise and the roller 40 rotates counterclockwise. Due to the pressure exerted by the rolls 38, 40 on the mold element 10 (corresponding to the arrows 23'), as well as to a longitudinal expansion, caused in particular by the tensile force of the rolls 38, 40, the elastic mold element 10 is compressed. Due to this compression, the volume of the mold openings 12 of the mold element 10 decreases. This change in the volume of the mold openings 12 is illustrated in the region A. Here, the mold element has already been compressed in the region of the mold opening 12", so that the volume of the mold opening 12' is reduced. In the region of the mold opening 12', however, the mold element 10 is not yet compressed, so that the volume of the mold openings 12' is in the initial state.

As illustrated, an auxiliary element 26 is supplied in the region between the rolls 38, 40 in the direction of the arrow 58. Here, the auxiliary element 26 covers the first side 16 of the compressed mold element 10, so that the first openings 14' of the mold openings 12' reduced in volume are closed.

After having passed the region between the rolls 38, 40, the mold element relaxes, preferably restores itself elastically. This is illustrated in region B. Due to the elastic deformation of the mold element 10, the volume of the mold openings 12 expands. This results in a negative pressure in the mold openings 12. Due to the negative pressure, the first formulation 22 is drawn through the second openings 18 of the mold openings 12. The mold opening 12' shown on the right has already fully expanded, so that a part of the mold openings 12''' is already completely filled with the first formulation 22". In contrast to this, the volume of the mold openings 12m has not yet fully expanded, so that only a part of the formulation 22" has been taken up, while a part of the formulations 22' remains in the depression 32. When the mold openings 12m are moved on and fully expanded, this remaining formulation 22' can also be taken up.

FIG. 2c also illustrates a subsystem 101 for producing microstructures with a compression device 37, a mold element 10, an auxiliary element 26 and a formulation element 30. This compression device 37 is in particular a press device. The subsystem 101 corresponds to an embodiment of a system 100 for producing microstructures according to the invention.

FIG. 3 also shows a production state, it being preferred that the embodiment in FIG. 2b is supplied from the left in the direction of the arrow 52. The embodiment in FIG. 3 is, in particular, an alternative to the embodiment in FIG. 2c. The illustration in FIG. 3 is analogous to the illustration FIG. 2c.

The compression device 37, which in the present instance comprises two offset rolls 38, 40, bends the mold element 10 about the roll 40. As illustrated, the mold element with the formulation element 30 connected thereto extends from the left to the right (in the direction of the arrows 52, 54). The direction of rotation of the rolls 38, 40 is illustrated by the arrows 56. As illustrated, it is preferred that the roll 38 rotates clockwise and the roller 40 rotates counterclockwise. By bending the mold element 10, a compressed portion 72, also referred to as a compressed strand, and a stretched portion 74, also referred to as a stretched strand, of the mold element 10 exist on either side of the neutral strand 70 (as illustrated in region B'). The compression (illustrated by arrow 76) causes a reduction of the volume 13' in the compressed portion of the mold opening 12'. In the stretched portion of the mold opening 12", however, an increase of the volume 13" is caused. Since the volume fraction of the compressed portion is significantly larger when compared to the portion located in the stretched portion, a reduction of volume of the mold opening 12' is effected in total.

In the region A', however, the mold element 10 is not (yet) bent, so that the volume of the mold openings 12' is (still) in the initial state.

As illustrated, an auxiliary element 26 is supplied in the region between the rolls 38, 40 in the direction of the arrow 58. Here, the auxiliary element 26 covers the first side 16 of the compressed mold element 10, so that the first openings 14' of the mold openings 12' reduced in volume are closed.

After having passed through the region between the rolls 38, 40, the mold element 10 is restored to the unbent initial state. Thereby, an increase in total volume of the mold opening occurs, contrary to the reduction in total volume in region B'. This results in a negative pressure in the mold openings 12. Due to the negative pressure, the first formulation 22 is drawn through the second openings 18 of the mold openings 12.

FIG. 3 also illustrates a subsystem 101 for producing microstructures comprising a compression device 37, a mold element 10, an auxiliary element 26 and a formulation element 30. This compression device 37 is in particular a bending device. The subsystem 101 corresponds to an embodiment of a system 100 for producing microstructures according to the invention.

FIG. 4 shows another state according to a method for producing microstructures according to the invention. A mold element 10 is supplied from the left in the direction of the arrow 52. The mold element 10 comprises a plurality of mold openings 12. The lower side of the mold element 10 is connected to a formulation element 30. It is preferred that the mold element 10 is implemented according to the embodiments in FIG. 1d or 2c, however, with the auxiliary element 26 removed, in particular pulled off.

In the region C illustrated, the mold openings 12' are already partially filled with a first formulation 22', while, however, the region of the pyramid base of the mold openings 12' is empty. A formulation 50, preferably free of active ingredients, has been applied on the first side 16 of the mold element 10 in the region of the first openings 14.

A second formulation element 116, which is in particular designed as a film, is supplied in the direction of the arrow 60, the element covering the second formulation. Pressure is exerted on the second formulation element 116 via the roll 110, so that the second formulation element 116 is connected to the mold element 10 by being pressed onto the same. Thereby, the second formulation 50 is pressed into the empty portions of the mold openings 12'.

In the region D illustrated, the mold openings 12" are thus filled with the second formulation 50'. Thus, the mold openings 12 are all filled with formulations which, in particular after solidification, correspond to microstructures.

FIG. 4 shows a subsystem 103 of a system 100 for producing microstructures.

FIG. 5 shows an embodiment of a system 100 for producing microstructures according to the invention.

The system 100 is arranged in a housing 102. The housing is preferably sterile with respect to the environment. Elements supplied are preferably sterilized before being supplied and/or are passed into the housing 102 through mouseholes. In particular, the housing 102 is an insulator. The films are preferably introduced into the system using a packaging tube.

A first formulation element 30 is supplied in the direction of the arrow 52', in particular using a packaging tube 31. An auxiliary element 26, preferably designed as a film, is supplied in the direction of the arrow 58. The auxiliary element 26 is supplied, in particular, in a packaging tube 47.

The region illustrated in box IIc is designed, in particular, corresponding to the embodiment in FIG. 2c or FIG. 3. Here, the first formulation 22 is provided through a first formulation dispenser 21 which applies the formulation 22 as droplets 22' on the formulation element 30, in particular into depressions 32 of the formulation element 30.

Behind the region IIc, the auxiliary element 26 is preferably discharged via rollers 108.

Subsequently, the first formulation 22 in the mold element 10' is preferably dried using a drying device 104a.

This is preferably followed by a testing of the mold element 10", in particular of the preferably solidified formulation 22. The testing is preferably performed by means of a test device 106a. The test device is in particular configured as an optical device. It is particularly preferred that the test device comprises at least one camera.

The adjoining region III is preferably designed as illustrated in FIG. 4. The second formulation 50 is provided in particular using a second formulation dispenser 51 which applies the formulation 50 as droplets 50' onto the mold element 10m. The second formulation element 60 is supplied in particular using a packaging tube 118. The second formulation element 60 comprises, in particular consist of in particular a permeable and/or moisture-absorbing film.

Downstream of the region III, the mold element 10 is preferably discharged via rollers 114. It is particularly preferred in this context that the first formulation element 30 is discharged along therewith. However, it is also possible that the first formulation element 30 is discharged already at an earlier time, i.e. sometime after the region IIc. Upon discharging the mold element 10, the formulations 22, 50, which are preferably bonded to form microstructures 120, are demolded. It is preferred in this context that the microstructures 120 are connected, e.g. adhesively, to the second formulation element and that the demolding and further transport of the microstructures 120 is thus performed.

Prior to and/or during demolding, the preferably connected formulations 22, 50, which correspond to the microstructures 120 to be produced, are preferably dried. Drying can be performed using the drying device 104b. In addition or as an alternative, however, air drying can also be performed using the preferably permeable and/or moisture-absorbing film 60.

Preferably, the microstructures 120 are tested after deforming. It is preferred that the testing is performed using the test device 106b. The test device comprises in particular at least one camera.

Subsequently, the microstructures 120 are preferably packaged. To this end, it is preferred to supply a blister film 122 in the direction of the arrow 62. The supply is performed in particular over rollers 126, 128. The blister film 122 comprises a plurality of blisters 123 open to the top.

In the region E, the blister film 128 is joined with the microstructures 120. In doing so, the microstructures 120 are received in the blisters 123, so that blister-packaged microstructures 124 are obtained. These are discharged in the direction of the arrow 54.

The invention claimed is:

1. A method for producing microstructures, the method comprising the steps of:
   providing a planar mold element, which comprises at least one mold for the microstructure to be produced, each of the at least one mold having a first opening and a second opening, wherein the second opening is located opposite the first opening;
   providing a first formulation at the second opening, wherein the formulation contains an active ingredient;
   reducing a volume of the at least one mold, wherein reducing the volume of the at least one mold is achieved by a compression of the mold element;
   generating a negative pressure in the at least one mold; and
   taking up the first formulation through the second opening into the at least one mold on account of the negative pressure in the at least one mold,
   wherein the step of reducing the volume of the at least one mold by a compression of the mold element occurs prior to an expansion of the volume of the at least one mold, and
   wherein the compression is achieved by pressing and bending of the mold element so as to reduce the volume of the at least one mold.

2. The method of claim 1, further comprising the step of expanding the volume of the at least one mold to generate the negative pressure in the at least one mold.

3. The method according to claim 1, wherein the compression of the mold element is performed using at least one roll.

4. The method according to claim 1, further comprising, prior to the step of generating the negative pressure in the at least one mold, the step of arranging an auxiliary element on a side of the mold element having the first opening.

5. The method according to claim 1, further comprising, prior to the step of generating the negative pressure in the at least one mold, the step of closing the first opening of the at least one mold.

6. The method according to claim 4, further comprising, after the taking-up of the first formulation into the second opening of the at least one mold, removing the auxiliary element from the mold element.

7. The method according to claim 1, wherein the at least one mold is cylindrical or conical.

8. The method according to claim 1, wherein the mold element comprises a film.

9. The method according to claim 1, further comprising, after the taking-up of the first formulation, the steps of:
   providing a second formulation at the first opening, the second formulation being free of an active ingredient; and
   taking up the second formulation into the at least one mold through the first opening, the second formulation bonding with the first formulation.

10. The method according to claim 9, wherein providing the first formulation is performed using a first formulation element designed as a film, the first formulation element comprising the first formulation; and/or wherein providing the second formulation is performed using a second formulation element designed as a film, the second formulation element comprising the second formulation.

11. The method according to claim 9, further comprising the step of demolding the first formulation, which has at least partially solidified to form a microstructure, and the second formulation at the first opening of the at least one mold.

12. The method according to claim 11, wherein the demolding step is performed using a cover element comprising a cover film, which cover element is substance-bonded with the first formulation; and/or the step demolding is performed by pulling off the mold element.

13. The method according to claim 11, further comprising the step of packaging the demolded microstructure using a blister element.

14. The method according to claim 1, wherein the method is performed using a system that is designed to form microstructures.

15. A method for producing microstructures, the method comprising the steps of:
   providing a planar mold element, which comprises at least one mold for the microstructure to be produced, each of the at least one mold having a first opening and a second opening, wherein the second opening is located opposite the first opening;
   providing a first formulation at the second opening, wherein the formulation contains an active ingredient;
   reducing a volume of the at least one mold, wherein reducing the volume of the at least one mold is achieved by a compression of the mold element;
   generating a negative pressure in the at least one mold;

taking up the first formulation through the second opening into the at least one mold on account of the negative pressure in the at least one mold;

providing a second formulation at the first opening, the second formulation being free of an active ingredient;

taking up the second formulation into the at least one mold through the first opening, the second formulation bonding with the first formulation; and demolding the first formulation, which has at least partially solidified, and the second formulation at the first opening of the at least one mold to form a microstructure, wherein the step of reducing the volume of the at least one mold by the compression of the at least one mold element occurs prior to an expansion of the volume of the at least one mold.

16. A method for producing microstructures, the method comprising the steps of:

providing a planar mold element, which comprises at least one mold for the microstructure to be produced, each of the at least one mold having a first opening and a second opening, wherein the second opening is located opposite the first opening;

providing a first formulation at the second opening, wherein the formulation contains an active ingredient;

reducing a volume of the at least one mold, wherein reducing the volume of the at least one mold is achieved by a compression of the mold element;

generating a negative pressure in the at least one mold;

taking up the first formulation through the second opening into the at least one mold on account of the negative pressure in the at least one mold; and expanding the volume of the at least one mold to generate the negative pressure in the at least one mold, wherein the step of reducing the volume of the at least one mold by the compression of the mold element occurs prior to an expansion of the volume of the at least one mold, wherein the compression is achieved by pressing and bending of the mold element so as to reduce the volume of the at least one mold, and wherein the compression of the mold element is performed using at least one roll.

* * * * *